March 15, 1938. A. TAYLOR 2,110,923
STICK HANDLING MECHANISM
Filed March 11, 1937 4 Sheets-Sheet 1
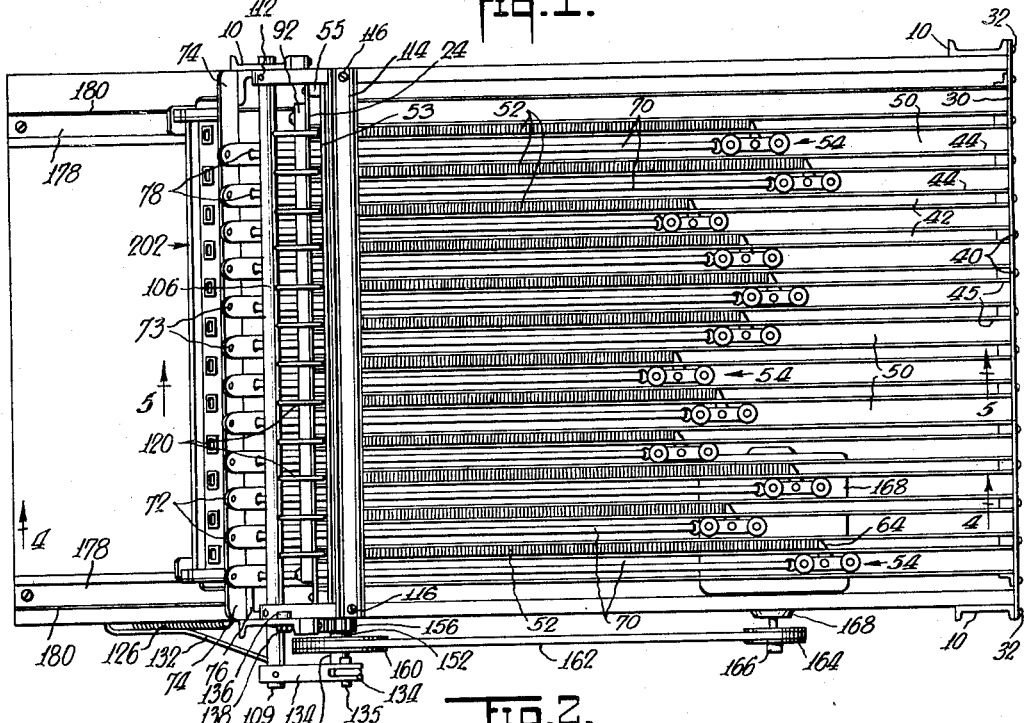
INVENTOR
Andrew Taylor
BY
ATTORNEY

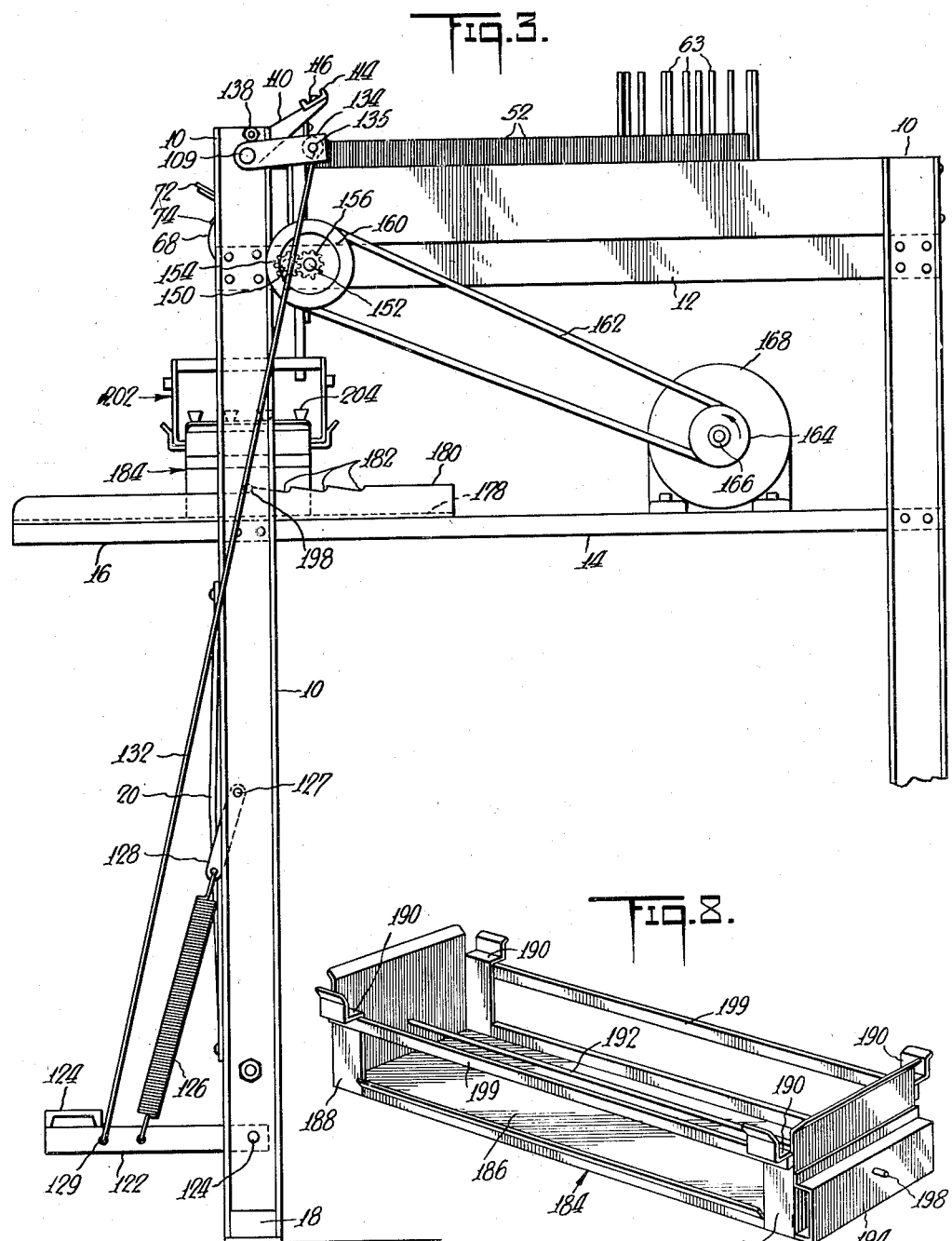

March 15, 1938. A. TAYLOR 2,110,923
STICK HANDLING MECHANISM
Filed March 11, 1937 4 Sheets-Sheet 3

INVENTOR
Andrew Taylor
BY
Richard J Cowling
ATTORNEY

March 15, 1938.  A. TAYLOR  2,110,923
STICK HANDLING MECHANISM
Filed March 11, 1937   4 Sheets-Sheet 4
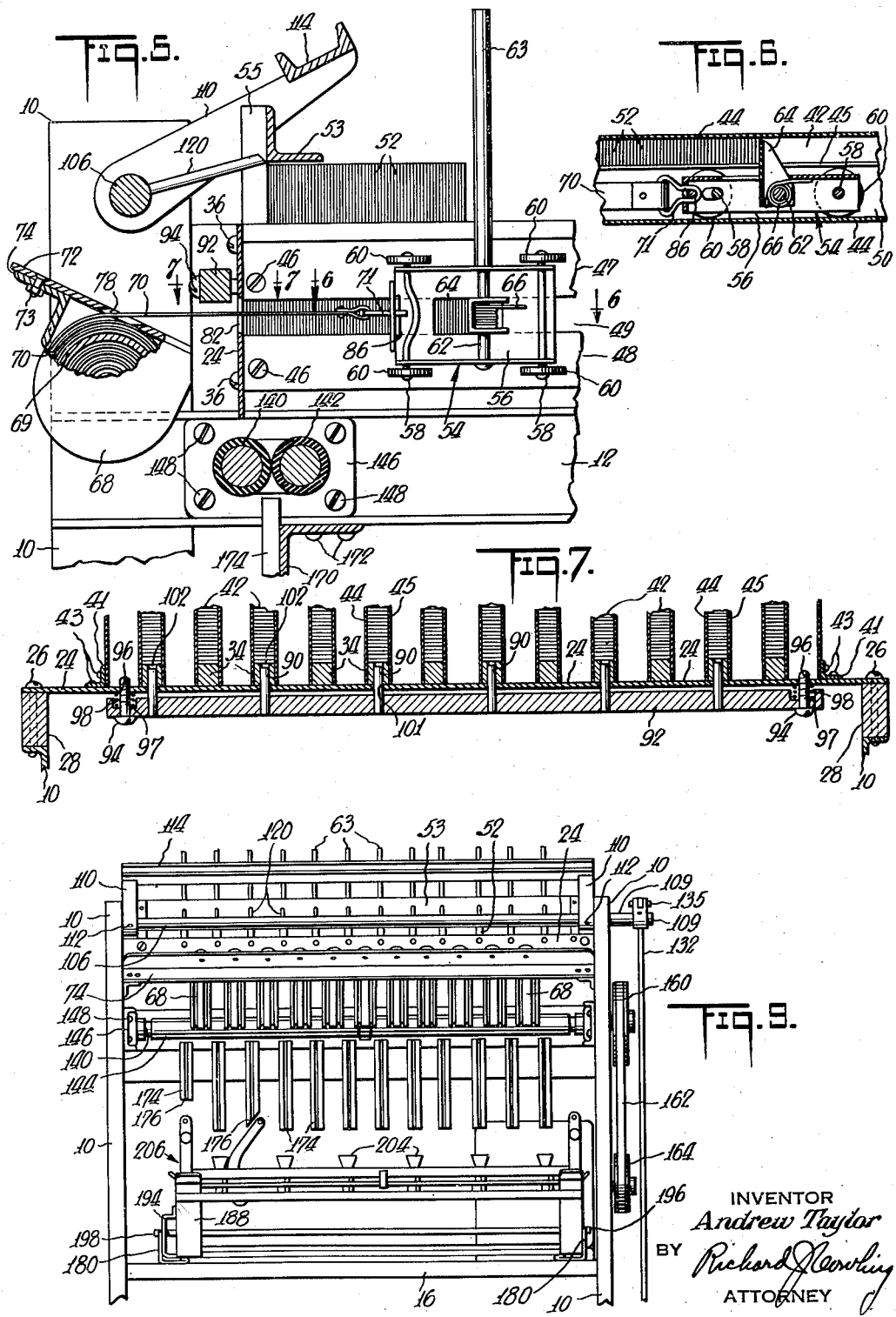
INVENTOR
Andrew Taylor
BY Richard J. Cowling
ATTORNEY Patented Mar. 15, 1938

2,110,923

UNITED STATES PATENT OFFICE 2,110,923

STICK HANDLING MECHANISM

Andrew Taylor, Saratoga Springs, N. Y., assignor to Joe Lowe Corporation, New York, N. Y., a corporation of Delaware Application March 11, 1937, Serial No. 130,299

18 Claims. (Cl. 107—7)

The present invention relates generally to article handling, dispensing and positioning apparatus, and it has particular relation to semi-automatic apparatus capable of holding a quantity of splints or wooden handle members in a plurality of spaced magazines, simultaneously selecting a splint from a plurality of said magazines and delivering the selected splints in spaced relation to receptacles of a portable article receiver positioned therebelow.

The invention is designed primarily for the handling of elongated flat handle members, or splints of wood, such as those commonly employed in the manufacture of frozen handled confections of the character disclosed in Letters Patent No. 1,965,292, issued July 3, 1934, to Leonard B. Krick. In the manufacture of such confectionery products, the present practice is to manually position the handle members in spaced receptacles of a portable stick receiving and carrying device, such as is shown in Letters Patent No. 2,024,116, issued December 10, 1935, to Herbert A. Siemund, wherein the upper ends of the handle members are gripped within said receptacles and the lower ends thereof depend freely at equal distances therebelow. The stick positioning and carrying device, with a plurality of spaced, locked, handle members positioned therein, is then placed over a multi-cavity mold containing a substance, or substances, to be solidified. By means of this portable stick positioning device the individual sticks are properly centered with respect to the individual mold cavities, and the freely depending lower ends thereof are immersed a predetermined distance in the substance or substances subsequently to be solidified in said mold cavities in the presence of said handle members.

An object of the present invention is to provide a simple and inexpensive semi-automatic apparatus for simultaneously handling, selecting and depositing a plurality of handle members in spaced relation in a portable holder in an efficient and sanitary manner.

Another object of the invention is the provision of apparatus of the character described which is suitable for manipulating and handling a plurality of handle members of various shapes and/or sizes without requiring adjustment.

Another object of the invention is the provision of a machine of the character described which is capable of varying the number and/or spacing of the handle members being manipulated and delivered during a single operation.

A further object of the invention is to provide a machine of the character described with a simple and inexpensive reversible carriage member for varying the position of the receiving receptacles of a portable stick holder relative to the discharge orifices of the magazine structure, and for suitably gauging the sticks delivered to the receptacles of said holder so as to determine the distance to which the ends of said sticks will depend from said holder.

Another object of the invention is the provision of a machine of the character described wherein the stick tensioning mechanism of the magazine structure is provided with simple, efficient and inexpensive means for quickly and conveniently inserting additional handle members to the diminishing supply of said magazines without stopping or impeding the operation of said machine.

A further object of the invention is to provide a machine of the character described which is simple and inexpensive to operate, which is substantially fool-proof in operation, and which does not need or require the attention and supervision of a skilled operator.

Another object of the invention is the provision of a semi-automatic machine of the character described, having a minimum of moving parts requiring but very little power to operate, and further requiring but very little manual exertion on the part of the operator to effect the delivery of a plurality of spaced handle members, and a shifting of the carriage mechanism for filling the successive rows of receptacles of a portable holder.

Other and further objects and advantages of the invention reside in the detailed construction of the apparatus, which result in simplicity, economy and efficiency, and which will be apparent from the following description, wherein one form of embodiment of the invention is shown, reference being had to the accompanying drawings, forming a part hereof, in which:

Fig. 1 is a top plan view of a machine embodying the invention;

Fig. 2 is a front elevational view of the machine shown in Fig. 1;

Fig. 3 is a side view of the machine shown in Fig. 1;

Fig. 5 is a cross-sectional view of the machine shown in Fig. 1, the same being taken along the line 5—5 thereof, looking in the direction of the arrows;

Fig. 6 is a transverse sectional view of the stick tensioning mechanism of the machine shown in Fig. 5, the same being taken along the line 6—6 thereof, looking in the direction of the arrows;

Fig. 7 is a sectional view of the machine shown in Fig. 5, the same being taken along the line 7—7 thereof, looking in the direction of the arrows, and illustrating the mechanism for varying the number and/or spacing of the handle members to be manipulated and delivered during a single operation;

Figure 4:
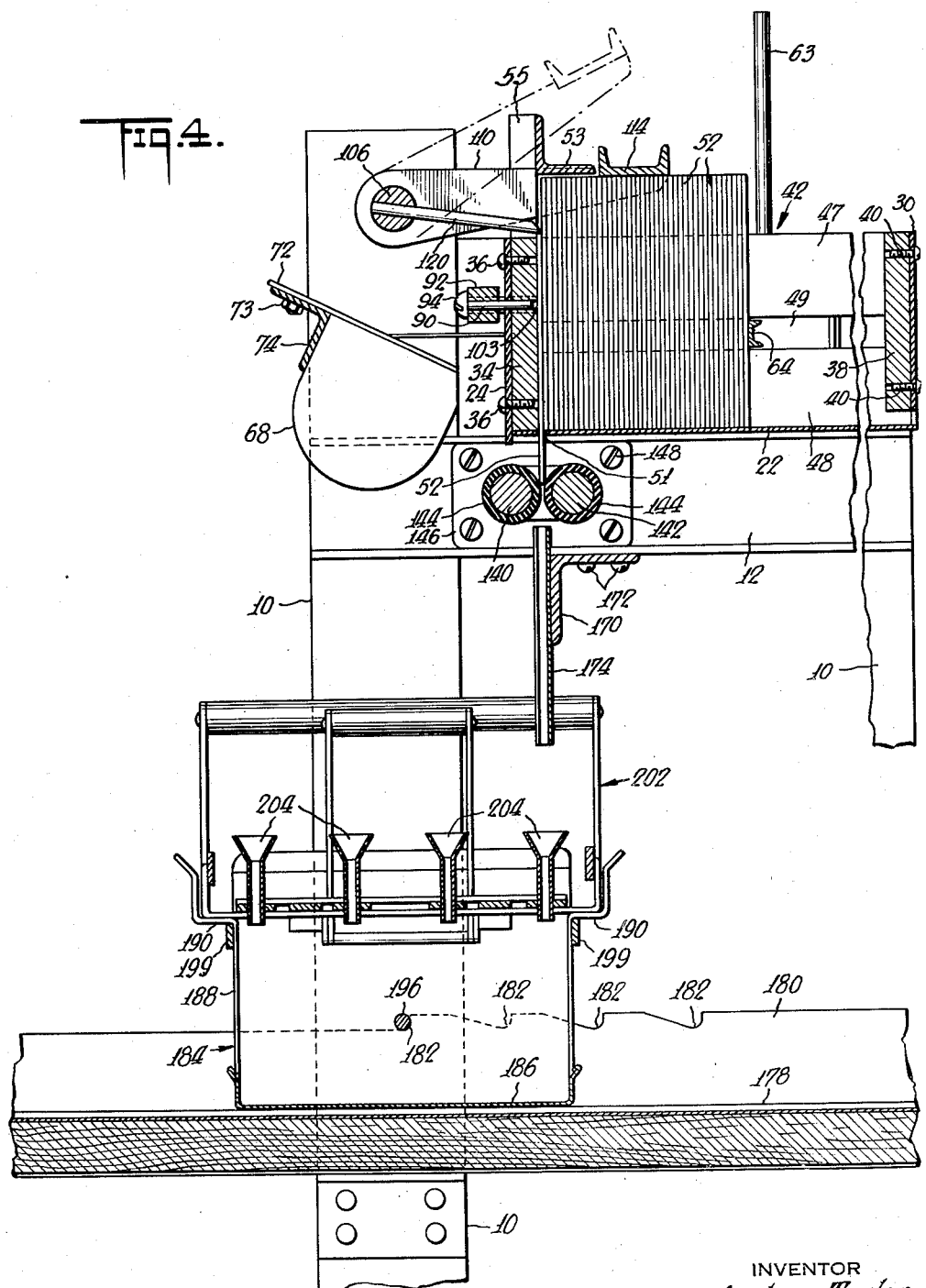
Fig. 4 is a cross-sectional view of the machine shown in Fig. 1, the same being taken along the line 4—4 thereof, looking in the direction of the arrows.

Fig. 8 is a perspective view of the reversible carriage for receiving the portable stick-holder or article receiver and spacing the receptacles thereof with respect to the delivery orifices of the magazine structure; and Fig. 9 is a front elevational view of the machine viewed as in Fig. 2, but illustrating a modified portable stick holder or article receiver, wherein the receptacles of each longitudinal row are six in number instead of twelve as shown in the article receiver of Fig. 2.

Referring now to the drawings there is shown a main frame structure consisting of four spaced upright supporting channel standards or legs 10 connected intermediate their ends by suitably spaced upper and lower angle iron frame members 12 and 14, the latter having a portion 16 extending beyond the front of the front standards 10 thereof to provide a support for a projecting apron. The standards 10 are provided with supporting feet 18 at the extreme lower ends thereof, and are also suitably braced across the front and back below the frame 14 by diagonal bracing members 20.

The upper rectangular angle iron frame member 12 is mounted on the legs 10 a short distance below the tops thereof, and provides a suitable support for a bed plate 22 mounted on the top side thereof slightly back of the front standards 10 and covering the entire rear portion of said frame member 12. A baffle plate 24 is vertically mounted adjacent the front edge of the bed plate 22 and extends upwardly therefrom. The baffle plate 24 is secured in a fixed upright position by machine screws 26 extending through spacer blocks 28 and threaded to the inside flanges of the front standards 10, as best shown in Fig. 7. An end plate 30 extends vertically across the rear of the bed plate 22, and is suitably secured to the outside flanges of the rear standards 10 by machine screws 32 (see Fig. 3).

A series of twelve vertically extending spacer bars 34 are mounted in spaced relation transversely of the baffle plate 24 by suitable machine screws 36 (see Fig. 4), and a corresponding series of spacer bars 38 are mounted correspondingly of the rear end plate 30 by machine screws 40. A plurality of twelve spaced longitudinally extending open-top splint receiving channels or magazines 42 are formed using the bed plate 22 as the bottom portion thereof by connecting the spacer bars 34 and 38 with suitable partitioning members 44 and 45 by screws 46, excepting the end partitions which are suitably mounted on the plates 24 and 30 by angle iron brackets 41 secured by bolts 43 (see Fig. 7). It will be noted that the partitioning member 44 is of single sheet metal construction, whereas, the member 45, forming the opposite side of each magazine 42, is constructed of two separate sheet metal strips 47 and 48 spaced vertically to provide a central longitudinal slot 49 extending the entire length of the magazines 42. The plurality of spaced magazines 42 so formed provide a series of channel-like openings 50 therebetween of substantially greater width than the magazines 42. A discharging orifice 51 (see Fig. 4) is provided adjacent the front of each splint receiving magazine 42 directly behind the spacer bar 34. The orifice 51 is of a size and shape sufficient only to permit one splint 52 at a time to be passed therethrough. An angle iron guide bar 53 is mounted transversely of the machine above the baffle plate 24 and spacer bars 34 on arms 55 projecting upwardly from the ends of the plate 24. The bar 53 provides means for preventing the splints 52 adjacent the front discharging ends of the magazines 42 from raising up out of position for proper ejectment after having been previously tamped into ejectment position by a suitable tamping bar to be hereinafter described.

Individual tensioning means is provided for each of the twelve spaced magazines 42 for engaging the back side of the last splint of the row of splints therein, and for forcing them forwardly to maintain the foremost splint of the row in contact with the spacer bar 34. One type of continuous pressure exerting means that has proven very effective for the purpose is shown generally in Fig. 1, and in detail in Figs. 5 and 6.

This individual tensioning means includes a follower member 54 adapted to ride in the channel-like passage-way 50 between adjacently spaced magazines 42, said follower 54 having a channel supporting carriage 56 suitably mounted on a pair of spaced transversely extending fixed axles 58 having wheels 60 rotatably mounted on the projecting ends thereof. The wheels 60 are so spaced transversely of the carriage 56 as to ride centrally over the opening 49 and on the strips 47 and 48 of the partition 45 of the magazine 42. It will be noted (Fig. 6) that the wheels 60 are of a size sufficient to engage the opposite partition 44 of the next adjacent magazine 42, thereby completely filling the channel-like passage-ways 50 and using the sides thereof as operating guide rails. A third fixed axle 62 is mounted transversely of the carriage member 56 intermediate the axles 58, which is provided with an extending handle member 63 projecting upwardly above the tops of the magazines 42 and also above the row of splints 52 contained therein. The handle member 63 provides means for facilitating a manual retraction of the followers 54 against their respective tensioning means for the insertion of additional splints 52 in the magazines 42. Mounted on the axle 62 centrally of the carriage 56 is a retractable projecting finger 64, which projects outwardly from the underside of the carriage 56 and extends through the slot 49 of the partition 45 of the magazine 42 to engage the back of the last splint of the row of splints contained therein. The finger 64 is so mounted on the axle 62 as to be capable of pivoting only in a counter-clockwise direction so that when pressure is exerted on the back side thereof it is entirely free to move inwardly of the carriage 56 and out of the magazine 42 through the slot 49. The finger 64 is provided with spring urging means 66 for causing it to return immediately to its projected position when the pressure has been removed from the back side thereof.

The individual tensioning means used to urge each of the followers 54 forwardly against their respective rows of splints in the magazines 42 consists of a cylindrical casing member 68 having a supporting arm 72 formed integrally therewith. The casing member 68 contains a conventional self-winding circular roller coil spring tensioning device 69 containing a suitable length of flat spring wire cable 70 having a coupling clip 71 securely mounted on the free end thereof and adapted to engage suitable fastening means on the follower 54. A plurality of tensioning members 68 are suitably mounted transversely of the front of the machine and in line with the channel-like passage-ways 50 in which their respective follower members 54 are intended to operate by securing their projecting arms 72 by means of bolts 73 to a transversely extending angular supporting bar 74 which, in turn, is fastened to the front standards 10. In this arrangement it will be noted that the flat self-winding cable 70 passes through an opening 78 in the arm 72, through an opening 82 in the baffle plate 24 and down along the passage-way 50 until it is secured by means of the coupling 71 to a suitable projecting pin 86 on the front of the carriage member 56 of the follower 54. By reason of the self-winding mechanism of the tensioning means a constant pull is exerted on the follower 54 when it is connected to the cable 70, thereby exerting continuous pressure against the row of stacked splints through its projecting finger 64.

Adjustable means (see Fig. 7) is provided for conveniently varying the number and/or spacing of the splints 52 to be ejected from their respective magazines and delivered to the projecting means during each operating stroke of the machine. Such means, in the present instance, is illustrated as a plurality of projecting stops or pins 90 extending into the front of alternate magazines 42, which pins 90 are mounted in the plate 92 and project outwardly from the inner face thereof. The plate 92 is adjustably fastened to the front of the baffle plate 24 by means of adjustment screws 94 on opposite ends thereof, which operate in threaded openings 96 extending through the plate 24. Mounted concentrically of the screws 94 in recesses 97 on the inner side of the plate 92 and between it and the front of the baffle plate 24 are springs 98, which tend to constantly urge the plate 92 away from the plate 24. The projecting pins or stops 90 of the plate 92 are of a length sufficient to project through the openings 101 and 102 of the plate 24 and the spacer bars 34, respectively, and into the front ends of the magazines 42 to engage the foremost splint of said magazine and prevent it from being moved by the follower 54 into contacting engagement with the bar 34 against the pressure of the tensioning mechanism 68 being urged on the back of the last splint of the row. In this manner the foremost splint is kept out of range of the ejecting means hereinafter to be described, and will not therefore be partially ejected during the operation of the machine. When it is desired to permit the foremost splint to be ejected from each of the magazines simultaneously, the screws 94 of the plate 92 are loosened or withdrawn from the plate 24 to an extent sufficient to permit the springs 98 to urge the plate 92 outwardly and away from the plate 24, thereby withdrawing the pins 90 out of the magazines 42 and into the spacer bar 34 and permitting the foremost splint of the row to again contact and abut the spacer bar 34 which brings it within range of the ejecting fingers of the ejectment means. Obviously, the adjustable means herein described may be readily adapted so as to vary the number of splints being ejected in a single operation, as well as the spacing thereof, by merely changing the positioning of the stops or pins 90 on the plate 92 so as to cause them to operate in the magazines desired.

At the upper forward end of the machine and directly in front of the baffle plate 24, there is provided a suitable transversely extending supporting shaft 106, journaled in bearings mounted directly in openings extending through the front standards 10, which shaft 106 extends on one side of the machine slightly beyond the standard 10 to provide a projecting stub shaft 109. A pair of arms 110, extending inwardly and upwardly at an angle to the horizontal, are keyed by means of a pin 112 to the opposite sides of the shaft 106 between the front standards 10, and are suitably connected at their outer ends by an upwardly extending U-shaped cross-arm or tamping bar 114 by bolts 116. The tamping bar 114 is disposed adjacent the ends of the arms 110 so as to clear the guard bar 53 adjacent the front end of the magazines 42 and contact the tops of a substantial number of splints of each row adjacent the rear edge of the bar 53 when in operation.

A plurality of transversely spaced pusher fingers 120 are fixedly mounted radially through the shaft 106 between the arms 110. In the illustration shown the fingers are twelve in number and are so spaced as to provide one finger centrally of each row of splints. The fingers 120 project inwardly and upwardly of the machine at an angle to the horizontal sufficient only to position the extreme outer ends thereof immediately above the top of the foremost splint of each row when the mechanism is in its ejectment position.

A simple form of mechanism for manually operating the reciprocable cross-head, including the tamping bar 114 and the pusher fingers 120, both of which are fixed to the shaft 106, may comprise a pair of transversely spaced treadle levers 122 having their rear ends fulcrumed on a shaft 124 mounted between the front standards 10. The free forward ends of the levers 122 carry a foot operating cross-bar 125. The right lever 122 is connected intermediate its ends by a spring 126 to a supporting link 128 which, in turn, is secured as at 127 to the right front standard 10 a short distance above the shaft 124. A second link rod 132 connects the right lever 122 intermediate the cross-bar 125 and the spring 126, as indicated at 129, to a horizontally extending link arm 134, as indicated at 135, which, in turn, is fixedly mounted adjacent the outer end of the stub shaft 109. Obviously, under such an arrangement, any downward movement of the cross-bar 124 will be transmitted through the link rod 132 and the link arm 134 to the shaft 109, which being merely a projecting portion of the shaft 106 causes the same to be moved in a clockwise direction. Movement of the shaft 106 in a clockwise direction will cause the tamping bar 114 and the pusher fingers 120 to be depressed or urged downwardly and into operating contact with the tops of the splints 52 of the magazines 42. By reason of the greater angular projection of the tamping bar 114 as compared to the pusher fingers 120, the former will not contact the tops of the splints of the various rows until the latter has caused a partial ejectment of the foremost splint of each row through the discharging orifices 51 and into the projecting mechanism hereinafter to be described. Thus, it will be apparent from the illustration shown that the downward movement of the cross-head is limited by the tamping bar 114 contacting the tops of a substantial number of splints of each row. The upward spring urged movement of the cross-head ejecting mechanism is limited by the stop 138 secured by a bolt 136 to the top of the adjacent standard 10, which stop 138 contacts the top of one of the arms 110 and prevents further upward movement of the entire mechanism.

Projecting means is mounted transversely of the machine immediately below the row of discharging orifices 51 of the twelve magazines 42, which, in the illustration shown, consists of a pair of juxtaposed roller members 140 and 142, provided with a resilient rubber covering 144 intermediate the ends thereof. The roller members 140 and 142 are journaled in suitable bearings mounted in brackets 146 secured by bolts 148 to the inner faces of the front standards 10. The rollers 140 and 142 have one end thereof projecting through the brackets 146 beyond the frame structure of the machine on the one side, thereby forming suitable stub shafts 150 and 152 upon which are fixedly mounted intermeshing gears 154 and 156, respectively. The stub shaft 152, carrying the intermeshing gear 156, extends slightly beyond the corresponding stub shaft 150 carrying the gear 154, and has a pulley wheel 160 fixedly keyed to the extending end thereof. A driving belt 162 connects the pulley 160 to a driving pulley 164 secured to a stub shaft 166 of a driving motor 168, which is mounted on the rear end of the frame structure 14. Obviously, a direct drive is provided for the roller members 140 and 142 from the motor 168 through the belt 162 and the pulley 160. The motor 168 operating in a counter-clockwise direction, being directly connected by the belt 162 to the wheel 160 fixed to the roller member 142 will cause the latter to turn in a corresponding direction, and through the intermeshing gears 156 and 154 the roller member 140 is caused to rotate in the opposite direction, thereby providing oppositely driven inwardly revolving juxtaposed roller members 140 and 142 for the projecting mechanism.

Immediately below the projecting mechanism above described, there is mounted a transversely extending angular supporting bar 170 secured by means of bolts 172 to the underside of the frame 14, as best shown in Fig. 4. A plurality of transversely spaced vertical delivery chutes 174 are mounted on the bar 170 by spot-welding or other suitable means. The delivery chutes 174 are twelve in number and are spaced transversely of the machine in vertical alignment with the discharging orifices 51, and extend substantially between but not contacting the rollers 140 and 142. The lower ends of the chutes 174 are spaced above the top of a carriage table support 178 mounted on the frame 14. In the illustration shown, it will be noted that several of the chutes 174 are cut away, as indicated at 176, for clearance purposes to permit a conventional portable article receiver to be positioned thereunder.

A carriage supporting table 178 is mounted on the frame 14, covering the front half thereof as well as the projecting portion 16 thereby forming an apron for the machine. Guide rails 180 are mounted on the top of the table 178, and are provided with a series of spaced notches or stops 182 for receiving the positioning means of a slidable carriage member 184 to accurately position the same with its portable article receiver directly below the delivery chutes 174.

A removable slidable carriage member 184, consisting of a rectangular gauging table 186 provided with upwardly extending end supporting members 188 having horizontal receiving platforms 190 positioned adjacent the upper corners thereof for receiving a portable article receiver in spaced relation to the gauging table 186. The carriage member 184 is also provided with a spacer member 194 on the outside of one of the ends thereof. The ends are suitably braced by a rod 192 extending centrally of the carriage member 184 and projecting outwardly through the ends 188 and through the spacer 194, thereby providing stubs 196 and 198 for engaging the stops 182 of the guide rails 180 of the table 178. Bracing strips 199 extending longitudinally of the sides of the member 184 connect the upper corners of the ends 188 thereof and provide additional reinforcement therefor.

The conventional portable article receivers 202 and 206, shown in Figs. 2 and 9, respectively, form no part of this invention, and since the operation of such devices is fully described in the Siemund patent above cited it is not believed necessary to go further into the details of the same herein. The article receiver 202 shown in Fig. 2 is provided with forty-eight spaced receiving receptacles 204 arranged in four transversely spaced rows of twelve each, while the receiver 206 shown in Fig. 9 is identical in construction except that it is provided with only twenty-four spaced article receiving receptacles 204 arranged in four transversely extending rows of six each, the receptacles of each row being merely spaced farther apart.

In describing the operation of the machine in the first instance, it will be assumed that the article receiver 202 having forty-eight receptacles is positioned in the carriage member 184, as shown in Fig. 4, and that the adjustable plate 92 and pins 90 are not extending beyond the spacer bar 34. In this position of the plate 92 splints will be ejected from each of the twelve magazines 42 during each operation of the machine.

In filling the magazines with splints, it is customary (but not essential) to secure the splints already stacked in bundles of fifty or more. One or more bundles of such splints may be placed in the magazine 42 directly behind the finger 64 of the follower 54. The operator now grasps the projecting handle 63 and moves the follower 54 backwardly of the magazine against the tensioning mechanism, the finger 64 pivoting on the axle 62 and being pushed out of the magazine 42 by the pressure of the splints on the back side thereof. When the finger 64 has passed the last splint in the magazine 42, the spring urging means 66 will cause it to again project through the slot 49 into the magazine 42. Upon releasing the handle 63, the tensioning mechanism will pull the follower 54 forwardly and cause the finger 64 to exert pressure on the back of the last splint in the row thereby forcing the foremost splint against the spacer bar 34. This forward pressure will prevent the foremost splint 52 from dropping out of the magazine 42 through the discharging orifice 51. The remaining magazines may be filled in a corresponding manner, and it will be obvious that a varying number of splints may be deposited in the various magazines without effecting the operation of the machine since independently functioning tensioning means is provided for each magazine.

The motor 168 is now ready to be connected to a suitable source of power (not shown), which causes the projecting mechanism comprising the roller members 140 and 142 to continuously rotate towards each other.

The article receiver 202 is now positioned on the platforms 190 of the carriage member 184, and the latter is then manually placed on the supporting table 178 with the projecting studs 196 and 198 positioned in the first notch 182 of the guide rails 180. In this position the back row of receptacles 204 is properly positioned directly under the delivery chutes 174.

By depressing the foot treadle 125 the vertically reciprocable cross-head is moved downwardly, the tamping bar 114 tamping down the tops of the splints of each row immediately behind the bar 53 so that they will be in proper position to pass under the bar 53. At the same time the pusher fingers 120 engage the tops of the foremost splints of each row and push them downwardly through the discharging orifices 51, thereby partially ejecting them from their respective magazines 42 and causing the lower ends of the splints to be moved into operating engagement between the revolving rubber covered rollers 140 and 142, which in turn completely withdraws them from the magazines and projects them downwardly into the spaced chutes 174, through which they pass into the open-tops of the receptacles 204 of the receiver 202 positioned therebelow. Upon releasing the foot pressure on the treadle bar 125, the spring urging means 126 causes the cross-head to return to its upper position, which is shown in Fig. 5. The back row of receptacles 204 now being filled with splints, the operator manually moves the carriage member 184 and contents backwardly of the machine until the studs 196 and 198 engage the second of the row of stops 182 of the rails 180. The machine is now ready to deliver a second row of splints to the next row of receptacles 204 of the holder 202 upon a second depressing of the foot treadle 125. Each successive row of receptacles 204 of the holders 202 and 206 are filled in a corresponding manner.

Assuming now that it is desirable to fill the portable holders 206, having only six receptacles 204 to a row, as shown in Fig. 9, it is first necessary to adjust the plate 92 and pins 90 so that the latter project beyond the spacer bars 34 into the front of the magazines 42 to be closed, which are, in the illustration given, the alternate magazines as shown in Fig. 7. This adjustment may be accomplished by turning or tightening the screws 94 at each end of the plate 92 to compress the spring urging means 98 to permit the plate 92 to contact the front of the baffle plate 24, in which position the pins 90 will prevent the foremost splint of the alternate magazines into which they project from coming within reach of the pusher fingers 120. Therefore, no splints will be projected from such magazines with each operation of the cross-head mechanism.

To properly position the holder 206 under the chutes 174, with its six open-top splint receiving receptacles 204 properly positioned under the delivery chutes receiving splints, it is necessary to reverse the carriage member 184 on the table top 178, as shown in Fig. 9, so that the plain end 188 thereof and its stud 196 are operating in the notches 182 of the right rail 180. The machine is now ready to be operated in the manner heretofore described for filling the receiver 202 with splints 52.

As many changes could be made in the above construction and many apparently widely different embodiments of the invention could be made without departing from the scope thereof, it is intended that all matter contained in the above description and shown in the accompanying drawings shall be interpreted as illustrative only and not in a limiting sense.

Having thus described my invention, what I claim as new and desire to secure by Letters Patent is:

1. In a machine of the class described, a frame structure, an article magazine mounted on said frame structure, projecting means mounted below said magazine, means mounted adjacent said magazine for partially ejecting the foremost article of said magazine downwardly until the lower end thereof engages said projecting means, and means for operating said projecting means to cause the same to completely withdraw the article from said magazine and deliver it to a receiver positioned therebelow.

2. In a machine of the class described, a frame structure, a plurality of spaced article magazines mounted on said frame structure, projecting means mounted below said magazines, means positioned adjacent said magazines for partially ejecting the foremost article of each magazine downwardly until the lower ends thereof engage said projecting means, and means for operating said projecting means to cause the same to completely withdraw the articles from their respective magazines and deliver them to receivers positioned therebelow.

3. In a machine of the class described, a frame structure, a plurality of spaced article magazines mounted on said frame structure, rotatable projecting means mounted on said frame structure below said magazines, reciprocable means carried by said frame structure for partially ejecting the foremost article of each magazine downwardly until the lower ends thereof engage said projecting means, and means for rotating said projecting means to cause the same to completely withdraw the articles from their respective magazines and deliver them into receivers therebelow.

4. In a machine of the class described, a frame structure, a plurality of spaced article magazines mounted on said frame structure, projecting means including a resilient roller member mounted on said frame structure immediately below said magazines, reciprocable means for partially ejecting the foremost article of each magazine downwardly until the lower ends thereof engage said projecting means, and means for rotating said roller member to cause the same to frictionally engage said articles and completely withdraw them from their respective magazines and thereupon deliver them into receivers spaced therebelow.

5. In a machine of the class described, a frame structure, a plurality of spaced article magazines mounted on said frame structure, projecting means including a pair of rollers disposed in juxtaposition and adapted to rotate toward each other mounted on said frame structure below said magazines, reciprocable means for partially ejecting the foremost article of each magazine downwardly until the lower ends thereof pass between said rollers, and means for rotating said rollers to cause the same to frictionally engage said articles thereby completely withdrawing them from their respective magazines and delivering them to spaced receivers positioned therebelow.

6. In a machine of the class described, a frame structure, a carriage support mounted on said frame structure, a carriage member slidably mounted on said support, an article magazine arranged on said frame structure above said carriage support, projecting means mounted intermediate said carriage support and said magazine, means for partially ejecting a plurality of articles from said magazine until the lower ends thereof engage said projecting means, and means for operating said projecting means to completely withdraw said articles from said magazine and cause them to be delivered in spaced relation to a portable article receiver positioned in said carriage member.

7. In a machine of the class described, a frame structure, a carriage support mounted on said frame structure, a carriage member slidably mounted on said support, a plurality of spaced article magazines arranged on said frame structure above said carriage support, projecting means rotatably mounted intermediate said carriage support and said magazines, reciprocable means for partially ejecting the foremost article from each of said magazines until the lower ends thereof engage said projecting means, and means for causing said projecting means to rotate to completely withdraw said articles from their respective magazines and deliver them in spaced relation to a portable receiver positioned on said carriage member.

8. In a machine of the class described, a frame structure, a carriage support mounted on said frame structure, a removable carriage member slidably mounted on said support, a plurality of spaced article magazines arranged on said frame structure above said carriage support, projecting means rotatably mounted intermediate said carriage support and said magazines, spaced delivery chutes mounted between said projecting means and said carriage member, reciprocable means for partially ejecting the foremost article from each of said magazines until the lower ends thereof engage said projecting means, and means for causing said projecting means to rotate to completely withdraw said articles from their respective magazines and project them into said chutes for delivery to spaced receptacles of a portable article receiver positioned on said carriage member.

9. In a machine of the class described, a frame structure, a carriage support mounted on said frame structure, a carriage member mounted slidably on said support, a plurality of spaced magazines arranged on said frame structure above said carriage support, projecting means mounted below said magazines including a pair of juxtaposed roller members adapted to rotate towards each other, spaced delivery chutes mounted between the bottom of said projecting means and the top of said removable carriage member and aligned with the openings in said magazines, reciprocable means for partially ejecting the foremost article from each of said magazines until the lower ends thereof are engaged by said roller members, and means for rotating said roller members to completely withdraw said articles from their respective magazines and project them into said spaced chutes for delivery to the receptacles of a portable article receiver mounted on said carriage member.

10. In a machine of the class described a frame structure, a carriage support mounted on said frame structure, a removable carriage member slidably mounted on said support, a plurality of spaced magazines arranged on said frame structure above said carriage support, projecting means rotatably mounted between said carriage member and said magazines, a vertically reciprocable cross-head having means carried thereby for partially ejecting the foremost article from each of said magazines until the lower ends thereof engage said projecting means, means for rotating said rollers to completely withdraw said articles from their respective magazines and deliver them in spaced relation to a portable article receiver positioned on said carriage member, and means for operating said vertically reciprocable cross-head.

11. In a machine of the class described, a frame structure, a carriage support mounted on said frame structure, a removable carriage member slidably mounted on said support, a plurality of spaced magazines arranged on said frame structure above said carriage support, projecting means including resilient roller members rotatably mounted between said carriage member and said magazines, means for continuously operating said projecting means, a vertically reciprocable cross-head having means carried thereby for partially ejecting the foremost article from each of said magazines until the lower ends thereof engage said projecting means, whereby said articles are completely withdrawn from their respective magazines and delivered in spaced relation to a portable article receiver positioned on said carriage member, and means for manually operating said vertically reciprocable cross-head.

12. In a machine of the class described, a frame structure, a splint carrying magazine mounted on said frame structure and having a plurality of spaced channel members forming spaced rows for receiving stacked splints, a baffle plate mounted adjacent the front ends of said channel members for closing said channels and providing an abutment for the foremost splint of each row, individual flexible tension means for each row of splints for exerting pressure at the back of each row of splints for maintaining the foremost splint of each row against said baffle plate, means mounted on said baffle plate for preventing the operation of certain rows of splints by keeping the foremost splint of such preselected rows from engaging said plate, reciprocable means for engaging the foremost splint of each row contacting said plate and partially ejecting the same from said channels, and means for engaging the lower projecting ends of said partially ejected splints and completely withdrawing them from their respective channels.

13. In a machine of the class described, a frame structure, a splint carrying magazine mounted on said frame structure and having a plurality of spaced channel members for forming spaced rows for receiving stacked splints, a baffle plate mounted adjacent the front ends of said channels formed by said spaced channel members for closing the ends thereof and providing an abutment for the foremost splint of each row, individual tension means for exerting continuous pressure at the back of each row of splints for maintaining the foremost splint of each row against said baffle plate, means adjustably mounted on said baffle plate for preventing the foremost splint of preselected rows from operatively engaging said plate, reciprocable means for engaging the foremost splint of each row contacting said plate and partially ejecting the same from said channels, and means for engaging the lower projecting ends of said splints and completely withdrawing the same from their respective channels.

14. In a machine of the class described, a frame structure, a plurality of splint carrying magazines mounted on said frame structure and having means for providing spaced rows for receiving stacked splints, a baffle plate mounted adjacent the front ends of said magazines for closing the same and providing an abutment for the foremost splint of each row, individual flexible tension means for exerting continuous pressure at the back of each row of splints for maintaining the foremost splint of each row against said baffle plate, means adjustably mounted on said baffle plate for preventing the foremost splint of preselected rows from operatively engaging said plate, reciprocable means for engaging the foremost splint of each row contacting said plate and partially ejecting the same from said magazine, and means for engaging the lower projecting ends of said splints and completely withdrawing them from their respective magazines, said tensioning means including a follower having retractable means projecting into each magazine for engaging the last splint and exerting pressure thereon to maintain the foremost splint adjacent the baffle plate.

15. In a machine of the class described, a frame structure, an article receiving magazine mounted on said frame structure and having a channel for receiving a row of stacked splints, means mounted on said frame structure for closing the front end of said channel, and continuous tensioning means including a follower member having a retractable finger pivotally mounted thereon for entering said channel and exerting pressure on the back of the last splint therein.

16. In a machine of the class described, a frame structure, a plurality of spaced article receiving magazines mounted on said frame structure and each having a channel for receiving a row of stacked splints, means mounted on said frame structure for closing the front ends of each channel of each magazine, and individual tensioning means for exerting continuous pressure on said rows of stacked splints in said channels, said tensioning means including a follower having a finger for entering said channel and exerting pressure on the back of the last splint therein, said finger being retractable from said channel when the follower is moved backwardly and the same engages splints that have been positioned in said channel behind said finger.

17. In a machine of the class described, a frame structure, a carriage support mounted intermediate the ends of said frame structure and having means for positioning a removable carriage member thereon, and, in combination therewith, a reversible carriage member slidably mounted on said carriage support, said carriage member including a gauging table having upright supporting members positioned at each end thereof, a spacing member mounted on the outside of one of said upright supporting members, and means carried by said spacing member for engaging the positioning means of said carriage support.

18. In a machine of the class described, a frame structure, a carriage support mounted intermediate the ends of said frame structure and having means for positioning a removable carriage member thereon, and, in combination therewith, a removable carriage member slidably mounted on said carriage support, said carriage member including a gauging table having upright supporting members mounted at each end thereof, means mounted on said upright supporting members for receiving a portable article receiver in spaced relation to said gauging table, a spacing member mounted on the outside of one of said upright supporting members, and means carried by said spacing member for engaging the positioning means of said carriage support.

ANDREW TAYLOR.